US008191585B2

(12) United States Patent
Mellone et al.

(10) Patent No.: US 8,191,585 B2
(45) Date of Patent: Jun. 5, 2012

(54) METHOD AND APPARATUS FOR MONITORING FOR A RESTRICTION IN A STAGE II FUEL VAPOR RECOVERY SYSTEM

(75) Inventors: Joseph A. Mellone, Gorham, ME (US); Randall S. Boucher, Saco, ME (US)

(73) Assignee: Franklin Fueling Systems, Inc., Madison, WI (US)

( * ) Notice: Subject to any disclaimer, the term of this patent is extended or adjusted under 35 U.S.C. 154(b) by 441 days.

(21) Appl. No.: 12/473,623

(22) Filed: May 28, 2009

(65) Prior Publication Data

US 2009/0293847 A1 Dec. 3, 2009

Related U.S. Application Data

(60) Provisional application No. 61/056,522, filed on May 28, 2008.

(51) Int. Cl.
*B65B 31/00* (2006.01)
(52) U.S. Cl. .................... 141/5; 141/1; 141/45; 141/50; 141/59; 141/98
(58) Field of Classification Search .................. 141/1, 4, 141/5, 44, 45, 47, 50, 54, 55, 59, 61, 94, 141/98, 392
See application file for complete search history.

(56) References Cited

U.S. PATENT DOCUMENTS

| 3,350,704 A | 10/1967 | Kessler |
| 3,735,634 A | 5/1973 | Clinton et al. |
| 3,745,338 A | 7/1973 | Joyce |
| 3,800,586 A | 4/1974 | Delatorre et al. |
| 4,131,216 A | 12/1978 | Gerstenmaier et al. |
| 4,147,096 A | 4/1979 | Caswell |
| 4,166,485 A | 9/1979 | Wokas |
| 4,215,565 A | 8/1980 | Zanker |
| 4,247,899 A | 1/1981 | Schiller et al. |
| 4,320,653 A | 3/1982 | Bernhardt |
| 4,410,109 A | 10/1983 | Murrell, Jr. et al. |
| 4,442,702 A | 4/1984 | Sawada |
| 4,462,249 A | 7/1984 | Adams |
| 4,508,127 A | 4/1985 | Thurston |

(Continued)

OTHER PUBLICATIONS

State of California, California Environmental Protection Agency, Air Resources Board, Final Statement of Reasons for Rulemaking, Including Summary of Comments and Agency Response, Public Hearing to Consider the Adoption, Amendment and Repeal of Regulations Regarding Certification Procedures and Test Procedures for Gasoline Vapor Recovery Systems, Public Hearing Dates: Mar. 23, 2000, Agenda Item No. 00-3-2 (211 pp.).

(Continued)

*Primary Examiner* — Gregory Huson
*Assistant Examiner* — Nicolas A Arnett
(74) *Attorney, Agent, or Firm* — Faegre Baker Daniels LLP (57) ABSTRACT

Systems and methods for detecting a failure in a Stage II fuel vapor recovery system are disclosed. An exemplary failure is a restriction in the vapor recovery system. In one detection system dispensing points may be flagged if it is determined that there has been a series of detected A/L ratios at the respective dispensing point below a first threshold. Further, an estimated ORVR penetration percentage may be determined for each dispensing point. In a second detection system an average A/L ratio for each dispensing point may be determined. The average A/L ratio may be an approximation of the average A/L ratio for non-ORVR transactions.

13 Claims, 3 Drawing Sheets

U.S. PATENT DOCUMENTS

| | | | |
|---|---|---|---|
| 4,523,454 A | 6/1985 | Sharp | |
| 4,534,208 A | 8/1985 | Macin et al. | |
| 4,543,819 A | 10/1985 | Chin et al. | |
| 4,566,504 A | 1/1986 | Furrow et al. | |
| 4,568,925 A | 2/1986 | Butts | |
| 4,570,686 A | 2/1986 | Devine | |
| 4,611,729 A | 9/1986 | Gerstenmaier et al. | |
| 4,653,334 A | 3/1987 | Capone | |
| 4,670,847 A | 6/1987 | Furuse | |
| 4,680,004 A | 7/1987 | Hirt | |
| 4,687,033 A | 8/1987 | Furrow et al. | |
| 4,749,009 A | 6/1988 | Faeth | |
| 4,827,987 A | 5/1989 | Faeth | |
| 4,835,522 A | 5/1989 | Andrejasich et al. | |
| 4,835,717 A | 5/1989 | Michel et al. | |
| 4,842,027 A | 6/1989 | Faeth | |
| 4,862,734 A | 9/1989 | Elderton | |
| 4,871,450 A | 10/1989 | Goodrich et al. | |
| 4,876,530 A | 10/1989 | Hill | |
| 4,914,943 A | 4/1990 | Lagergren | |
| 4,938,251 A | 7/1990 | Furrow et al. | |
| 4,967,809 A | 11/1990 | Faeth | |
| 4,978,029 A | 12/1990 | Furrow et al. | |
| 4,986,445 A | 1/1991 | Young et al. | |
| 5,013,434 A | 5/1991 | Furrow | |
| 5,014,543 A | 5/1991 | Franklin et al. | |
| 5,027,499 A | 7/1991 | Prohaska | |
| 5,038,838 A | 8/1991 | Bergamini et al. | |
| 5,040,077 A | 8/1991 | Hamano | |
| 5,040,576 A | 8/1991 | Faeth | |
| 5,040,577 A | 8/1991 | Pope | |
| 5,065,350 A | 11/1991 | Fedder | |
| 5,090,234 A | 2/1992 | Maresca, Jr. et al. | |
| 5,116,759 A | 5/1992 | Klainer et al. | |
| 5,129,433 A | 7/1992 | Faeth | |
| 5,131,262 A | 7/1992 | Wood et al. | |
| 5,143,258 A | 9/1992 | Mittermaier | |
| 5,151,111 A | 9/1992 | Tees et al. | |
| 5,156,199 A | 10/1992 | Hartsell, Jr. et al. | |
| 5,165,379 A | 11/1992 | Thompson | |
| 5,195,564 A | 3/1993 | Spalding | |
| 5,203,384 A | 4/1993 | Hansen | |
| 5,216,914 A | 6/1993 | Horner | |
| 5,220,822 A | 6/1993 | Tuma | |
| 5,240,045 A | 8/1993 | Faeth | |
| 5,244,022 A | 9/1993 | Gimby | |
| 5,267,470 A | 12/1993 | Cook | |
| 5,269,353 A | 12/1993 | Nanaji et al. | |
| 5,280,814 A | 1/1994 | Stroh | |
| 5,295,391 A | 3/1994 | Mastandrea et al. | |
| 5,317,899 A | 6/1994 | Hutchinson et al. | |
| 5,319,956 A | 6/1994 | Bogle et al. | |
| 5,323,817 A | 6/1994 | Spalding | |
| 5,325,312 A | 6/1994 | Kidd | |
| 5,325,896 A | 7/1994 | Koch et al. | |
| 5,327,776 A | 7/1994 | Yasui et al. | |
| 5,332,008 A | 7/1994 | Todd et al. | |
| 5,332,011 A | 7/1994 | Spalding | |
| 5,333,654 A | 8/1994 | Faeth | |
| 5,333,655 A | 8/1994 | Bergamini et al. | |
| 5,355,915 A | 10/1994 | Payne | |
| 5,365,985 A | 11/1994 | Todd et al. | |
| 5,369,984 A | 12/1994 | Rogers et al. | |
| 5,375,455 A | 12/1994 | Maresca, Jr. et al. | |
| 5,386,812 A | 2/1995 | Curran et al. | |
| 5,408,866 A | 4/1995 | Kawamura et al. | |
| 5,417,256 A | 5/1995 | Hartsell, Jr. et al. | |
| 5,423,457 A | 6/1995 | Nicholas et al. | |
| 5,448,980 A | 9/1995 | Kawamura et al. | |
| 5,450,883 A | 9/1995 | Payne et al. | |
| 5,452,621 A | 9/1995 | Aylesworth et al. | |
| 5,460,054 A | 10/1995 | Tran | |
| 5,461,906 A | 10/1995 | Bogle et al. | |
| 5,464,466 A | 11/1995 | Nanaji et al. | |
| 5,500,369 A | 3/1996 | Kiplinger | |
| 5,507,325 A | 4/1996 | Finlayson | |
| RE35,238 E | 5/1996 | Pope | |
| 5,526,679 A | 6/1996 | Filippi | |
| 5,542,458 A | 8/1996 | Payne et al. | |
| 5,563,339 A | 10/1996 | Compton et al. | |
| 5,563,341 A | 10/1996 | Fenner et al. | |
| 5,568,828 A | 10/1996 | Harris | |
| 5,571,310 A | 11/1996 | Nanaji | |
| 5,590,697 A | 1/1997 | Benjey et al. | |
| 5,592,979 A | 1/1997 | Payne et al. | |
| 5,625,156 A | 4/1997 | Serrels et al. | |
| 5,626,649 A | 5/1997 | Nanaji | |
| 5,650,943 A | 7/1997 | Powell et al. | |
| 5,663,492 A | 9/1997 | Alapati et al. | |
| 5,668,308 A | 9/1997 | Denby | |
| 5,671,785 A | 9/1997 | Andersson | |
| 5,689,061 A | 11/1997 | Seitter et al. | |
| 5,720,325 A | 2/1998 | Grantham | |
| 5,731,514 A | 3/1998 | Miwa et al. | |
| 5,752,411 A | 5/1998 | Harpster | |
| 5,755,854 A | 5/1998 | Nanaji | |
| 5,757,664 A | 5/1998 | Rogers et al. | |
| 5,765,121 A | 6/1998 | Schwager et al. | |
| 5,779,097 A | 7/1998 | Olson et al. | |
| 5,780,245 A | 7/1998 | Maroteaux | |
| 5,782,275 A | 7/1998 | Hartsell, Jr. et al. | |
| 5,794,667 A | 8/1998 | Payne et al. | |
| 5,803,136 A | 9/1998 | Hartsell, Jr. | |
| 5,832,967 A | 11/1998 | Andersson | |
| 5,843,212 A | 12/1998 | Nanaji | |
| 5,850,857 A | 12/1998 | Simpson | |
| 5,857,500 A | 1/1999 | Payne et al. | |
| 5,860,457 A | 1/1999 | Andersson | |
| 5,868,175 A | 2/1999 | Duff et al. | |
| 5,878,790 A | 3/1999 | Janssen | |
| 5,889,202 A | 3/1999 | Alapati et al. | |
| 5,890,474 A | 4/1999 | Schnaibel | |
| 5,898,108 A | 4/1999 | Mieczkowski et al. | |
| 5,911,248 A | 6/1999 | Keller | |
| 5,913,343 A | 6/1999 | Andersson | |
| 5,915,270 A | 6/1999 | Lehmann | |
| 5,942,980 A | 8/1999 | Hoben et al. | |
| 5,944,067 A | 8/1999 | Andersson | |
| 5,956,259 A | 9/1999 | Hartsell, Jr. et al. | |
| 5,964,812 A | 10/1999 | Schumacher et al. | |
| 5,985,002 A | 11/1999 | Grantham | |
| 5,988,232 A | 11/1999 | Koch et al. | |
| 5,992,395 A | 11/1999 | Hartsell, Jr. et al. | |
| 6,026,866 A | 2/2000 | Nanaji | |
| 6,037,184 A | 3/2000 | Matilainen et al. | |
| 6,038,922 A | 3/2000 | Mauze et al. | |
| 6,047,745 A | 4/2000 | Fournier | |
| 6,065,507 A | 5/2000 | Nanaji | |
| 6,070,453 A | 6/2000 | Myers | |
| 6,082,415 A | 7/2000 | Rowland et al. | |
| 6,102,085 A | 8/2000 | Nanaji | |
| 6,103,532 A | 8/2000 | Koch et al. | |
| 6,123,118 A | 9/2000 | Nanaji | |
| 6,131,621 A | 10/2000 | Garrard | |
| 6,151,955 A | 11/2000 | Ostrowski et al. | |
| 6,167,747 B1 | 1/2001 | Koch et al. | |
| 6,167,923 B1 | 1/2001 | Hartsell | |
| 6,169,938 B1 | 1/2001 | Hartsell | |
| 6,170,539 B1 | 1/2001 | Pope et al. | |
| 6,223,789 B1 | 5/2001 | Koch et al. | |
| 6,244,310 B1 | 6/2001 | Rowland et al. | |
| 6,247,508 B1 | 6/2001 | Negley, III et al. | |
| 6,289,721 B1 | 9/2001 | Blumenstock | |
| 6,302,165 B1 | 10/2001 | Nanaji et al. | |
| 6,305,440 B1 | 10/2001 | McCall et al. | |
| 6,308,119 B1 | 10/2001 | Majkowski et al. | |
| 6,311,548 B1 | 11/2001 | Breidenbach et al. | |
| 6,325,112 B1 | 12/2001 | Nanaji | |
| 6,336,479 B1 | 1/2002 | Nanaji | |
| 6,338,369 B1 | 1/2002 | Shermer et al. | |
| 6,347,649 B1 | 2/2002 | Pope et al. | |
| 6,357,493 B1 | 3/2002 | Shermer et al. | |
| D457,084 S | 5/2002 | Pope | |
| 6,386,246 B2 | 5/2002 | Pope et al. | |
| 6,418,981 B1 | 7/2002 | Nitecki et al. | |
| 6,578,408 B1 | 6/2003 | Denby | |
| 6,622,757 B2 | 9/2003 | Hart et al. | |

| | | |
|---|---|---|
| 6,802,344 B2 | 10/2004 | Hart |
| 6,802,345 B1 | 10/2004 | Hart et al. |
| 6,880,585 B2 | 4/2005 | Hart et al. |
| 6,901,786 B2 | 6/2005 | Hart |
| 6,964,283 B2 | 11/2005 | Hart |
| 6,968,868 B2 | 11/2005 | Hart et al. |
| 7,117,903 B1 * | 10/2006 | Castro ............... 141/83 |
| 7,275,417 B2 | 10/2007 | Hart |
| 7,849,728 B2 * | 12/2010 | Hart .................. 73/40 |
| 7,909,069 B2 * | 3/2011 | Hughes ............ 141/7 |
| 7,975,528 B2 * | 7/2011 | Hart ................. 141/59 |
| 2001/0039978 A1 | 11/2001 | Hart et al. |
| 2005/0121100 A1 | 6/2005 | Riffle |
| 2007/0267088 A1 | 11/2007 | Hughes |
| 2008/0216916 A1 | 9/2008 | Hart |

OTHER PUBLICATIONS

Wolf Koch, CARB Needs to Modify Plan for Improving Vapor Recovery Program, Viewpoint: More Time, Better Data Needed, Petroleum Equipment & Technology Magazine (Aug. 1999) (8 pp.).

Wolf Koch, Is CARB Playing Favorites? Unbalanced Treatment of Assist Vapor Recovery Systems, Petroleum Equipment & Technology Magazine (Nov. 1999) (3 pp.).

Ted Tiberi, Recognizing The Total Vapor Picture, Petroleum Equipment & Technology Magazine (Aug. 2000)(6 pp.).

Glen Walker, Separating the Good Air From the Bad, Petroleum Equipment & Technology Magazine (Aug. 2000) (6 pp.).

Robert Bradt, The Latest Word on Thermal Oxidizers, Petroleum Equipment & Technology Magazine (Sep. 2000) (7 pp.).

Koch and Simpson, An Evaluation of CARB's Performance Tests, Petroleum Equipment & Technology Magazine (Oct. 1999) (9 pp.).

Robert Bradt, Retooling the Vapor Recovery System, Petroleum Equipment & Technology Magazine (Aug. 2000) (3 pp.).

Draft Performance Standards for In-Station Diagnostics (to be incorporated into CP-201), California Air Resources Board (Aug. 1999) (1p.).

Robert Bradt, Retooling the Vapor Recovery System, Petroleum Equipment & Technology Magazine (Jul. 2000) (6 pp.).

California Environmental Protection Agency, Air Resources Board, Vapor Recovery Certification Procedure, CP-201, Certification Procedure for Vapor Recovery Systems at Gasoline Dispensing Facilities (Feb. 2001) (46 pp.).

California Environmental Protection Agency, Air Resources Board, Vapor Recovery Test Procedure, TP-201.5, Air to Liquid Volume Ratio (Feb. 2001) (14 pp.).

California Air Resources Board, Title 17, Notice of Public Hearing to Consider Amendments to the Vapor Recovery Certification and Test Procedure Regulations for Enhanced Vapor Recovery (Mar. 2000) (11 pp.).

California Environmental Protection Agency, Air Resources Board, Hearing Notice and Staff Report Enhanced Vapor Recovery Initial Statement of Reasons for Proposed Amendments to the Vapor Recovery Certification and Test Procedures for Gasoline Loading an dMotor Vehicle Gasoline Refueling at Service Stations (Feb. 2000) (140 pp.).

California Air Resources Board, Vapor Recovery Test Methods, Existing Procedures (Apr. 2000) (3 pp.).

California Air Resources Board, Vapor Recovery Test Methods, Existing Procedures (Mar. 2001) (5 pp.).

Can Escaping Vapors be Recaptured With New Technology? Petroleum Equipment & Technology Magazine (Apr. 1999) (6 pp.).

California Air Resources Board, Vapor Recovery Certification Procedure, CP-201 (Apr. 1996) (39 pp.).

California Air Resources Board, Vapor Recovery Certification Procedure, CP-201.2 (Apr. 1996) (71 pp.).

California Air Resources Board, Vapor Recovery Certification Procedure, CP-201.3 (Apr. 1996) (28 pp.).

Veeder-Root Company, ORVR Compatiblity and Vapor Recovery Monitoring (Sep. 2004) (2 pp.).

Dennis Weber, et al., Passive Vapor Monitoring of Underground Storage Tanks for Leak Detection (May 1989) (18 pp.).

International Preliminary Report on Patentability dated Nov. 30, 2010 in corresponding PCT application No. PCT/US2009/045428 (5 pages).

International Search Report dated Sep. 1, 2009 in corresponding PCT application No. PCT/US2009/045428 (3 pages).

* cited by examiner

METHOD AND APPARATUS FOR MONITORING FOR A RESTRICTION IN A STAGE II FUEL VAPOR RECOVERY SYSTEM

RELATED APPLICATIONS

This application claims the benefit of U.S. Provisional Patent Application Ser. No. 61/056,522, filed May 28, 2008, the entire disclosure of which is expressly incorporated by reference herein.

This application is related to U.S. Provisional Patent Application Ser. No. 61/056,528, filed May 28, 2008, the entire disclosure of which is expressly incorporated by reference herein.

TECHNICAL FIELD

This invention relates to a method and apparatus for monitoring a Stage II fuel vapor recovery system to detect a partial or complete blockage in the system.

BACKGROUND OF INVENTION

Historically as fuel was being dispensed into a vehicle's fuel tank, typically from an underground storage tank (UST), vapor in the vehicle's fuel tank would escape into the atmosphere. In order to prevent this, Stage II vapor recovery systems were developed to collect this vapor and return it to the UST.

Stage II vapor recovery systems recover fuel vapor released from a vehicle's fuel tank as fuel is being dispensed into the vehicle's fuel tank. As is known, Stage II vapor recovery systems may be a balance type system or a vacuum-assist type system. Stage II vapor recovery systems typically are only installed in urban areas where the escaping fuel vapors can pose a greater threat to the environment.

In a further effort to prevent fuel vapors from escaping into the atmosphere in areas where Stage II vapor recovery systems are not prevalent, automobiles and subsequently light vehicle trucks, sold in the United States have been required to include an on-board refueling vapor recovery (ORVR) system, which is a vehicle emission control system that captures fuel vapors from the vehicle's gas tank during refueling. No fuel vapors escape from the fuel tanks of such ORVR equipped vehicles.

It is desirable to detect whether there is a partial or complete blockage in the vapor return path of a Stage II vapor recovery system. However it can be difficult to distinguish a blocked or otherwise restricted vapor return path from that of refueling an ORVR equipped vehicle.

SUMMARY

In an exemplary embodiment of the present disclosure, a system for detecting a restriction in a stage II fuel vapor recovery system is provided. In another exemplary embodiment of the present disclosure, a method for detecting a restriction in a stage II fuel vapor recovery system is provided. In an exemplary embodiment of the present disclosure, a computer readable medium is provided including instructions which when executed by a controller are used to detect a restriction in a stage II fuel vapor recovery system.

In another exemplary embodiment of the present disclosure, a method for monitoring for a restriction in the vapor recovery system for a fuel dispensing system which dispenses fuel from a plurality of dispensing nozzles into ORVR and non-ORVR equipped vehicles is provided. The method comprising determining over a period of time, for each dispensing nozzle, an ORVR penetration ratio of A/L ratios below a first threshold versus A/L ratios above the first threshold; flagging one of the dispensing nozzles if it is determined that there has been a series of detected A/L ratios at the one dispensing nozzle below the first threshold; upon completion of the period of time, determining an average of the ORVR penetration ratios of the non-flagged dispensing nozzles; determining an acceptable ORVR penetration ratio as a function of the determined average ORVR penetration ratio; comparing the ORVR penetration ratio of each of the flagged dispensing nozzles to the acceptable ORVR penetration ratio; and providing an indication for a given flagged dispensing nozzle if the penetration ratio for the flagged dispensing nozzle is greater than the acceptable ORVR penetration ratio. In one example, the period of time is one day. In another example, the period of time is one week. In a further example, the indication is an alarm. In still another example, the function of the average penetration ratio is equal to [(1−average penetration ratio)/x+average penetration ratio], wherein x=a number greater than 1. In one variation, x=2. In yet another example, the method is performed by a controller.

In still another exemplary embodiment of the present disclosure, a system for monitoring for a restriction in the vapor recovery system for a fuel dispensing system which dispenses fuel from a plurality of dispensing nozzles into ORVR and non-ORVR equipped vehicles is provided. The system comprising a controller. The controller determines over a period of time, for each dispensing nozzle, an ORVR penetration ratio of A/L ratios below a first threshold versus A/L ratios above the first threshold; flags one of the dispensing nozzles if it is determined that there has been a series of detected A/L ratios at the one dispensing nozzle below the first threshold; upon completion of the period of time, determines an average of the ORVR penetration ratios of the non-flagged dispensing nozzles; determines an acceptable ORVR penetration ratio as a function of the determined average ORVR penetration ratio; compares the ORVR penetration ratio of the flagged dispensing nozzles to the acceptable ORVR penetration ratio; and provides an indication for a given flagged dispensing nozzle if the penetration ratio for the flagged dispensing nozzle is less than the acceptable penetration ratio. In one example, the period of time is one day. In another example, the period of time is one week. In a further example, the indication is an alarm. In still another example, the function of the average penetration ratio is equal to [(1−average penetration ratio)/x+average penetration ratio], wherein x=a number greater than 1. In one variation, x=2.

In another exemplary embodiment of the present disclosure, a method for monitoring for a restriction in the vapor recovery system for a fuel dispensing system which dispenses fuel from a plurality of dispensing nozzles into ORVR and non-ORVR equipped vehicles is provided. The method comprising for each fueling transaction, determining over a period of time an average of the A/L ratio for each fueling transaction either below a lower threshold or above an upper threshold, the upper threshold being greater than the lower threshold; determining whether a number of sequential fueling transactions having A/L ratios falling between the lower and upper thresholds exceed a threshold number; including fueling transactions having A/L ratios falling between the lower and upper thresholds in the average of the A/L ratios if the number of sequential fueling transactions having A/L ratios falling between the upper and lower thresholds exceed the threshold number, such inclusion to continue until a fueling transaction having an A/L ratio below the lower threshold or above the upper threshold is determined; comparing the determined average of the A/L ratios to a first lower test threshold and to a first upper test threshold; and providing an indication if the determined average of the A/L ratios is below the first lower test threshold or above the first upper test threshold. In one example, the threshold number of sequential fueling transactions having A/L ratios falling between the upper and lower thresholds is eleven. In another example, the period of time is a day. In a further example, the method further comprises determining a weekly ORVR average as an average of seven consecutive daily averages; comparing the determined average of the A/L ratios to a second lower test threshold and to a second upper test threshold; and providing an indication if the determined average of the A/L ratios is below the second lower test threshold or above the second upper test threshold.

In still another exemplary embodiment of the present disclosure, a system for monitoring for a restriction in the vapor recovery system for a fuel dispensing system which dispenses fuel from a plurality of dispensing nozzles into ORVR and non-ORVR equipped vehicles is provided. The system comprising a controller. The controller for each fueling transaction, determines over a period of time an average of the A/L ratio for each fueling transaction either below a lower threshold or above an upper threshold, the upper threshold being greater than the lower threshold; determines whether a number of sequential fueling transactions having A/L ratios falling between the lower and upper thresholds exceed a threshold number; includes fueling transactions having A/L ratios falling between the lower and upper thresholds in the average of the A/L ratios if the number of sequential fueling transactions having A/L ratios falling between the upper and lower thresholds exceed the threshold number, such inclusion to continue until a fueling transaction having an A/L ratio below the lower threshold or above the upper threshold is determined; compares the determined average of the A/L ratios to a first lower test threshold and to a first upper test threshold; and provides an indication if the determined average of the A/L ratios is below the first lower test threshold or above the first upper test threshold. In one example, the threshold number of sequential fueling transactions having A/L ratios falling between the upper and lower thresholds is eleven. In another example, the period of time is a day. In a further example, the controller determines a weekly ORVR average as an average of seven consecutive daily averages; compares the determined average of the A/L ratios to a second lower test threshold and to a second upper test threshold; and provides an indication if the determined average of the A/L ratios is below the second lower test threshold or above the second upper test threshold.

BRIEF DESCRIPTION OF THE DRAWING

The above-mentioned and other features and advantages of this invention, and the manner of attaining them, will become more apparent and the invention itself will be better understood by reference to the following description of an embodiment of the invention taken in conjunction with the accompanying drawings, wherein.

DETAILED DESCRIPTION OF THE PREFERRED EMBODIMENT

While this invention is susceptible of embodiments in many different forms, there is shown in the drawings and will herein be described in detail, preferred embodiments of the invention with the understanding that the present disclosure is to be considered as an exemplification of the principles of the invention and is not intended to limit the broad aspects of the invention to the embodiments illustrated.

Figure 1:
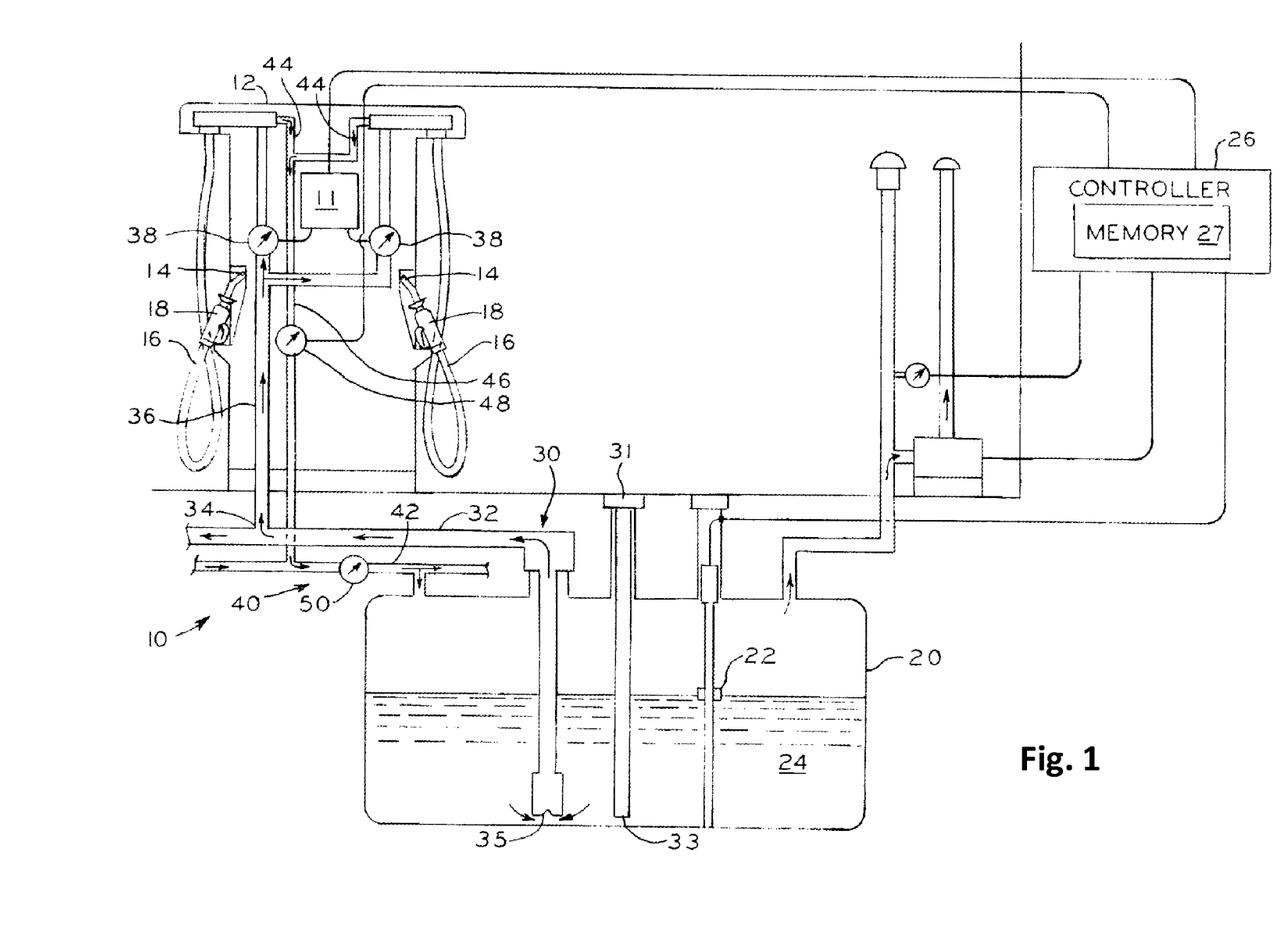
FIG. 1 is a block diagram of a fuel dispensing system in accordance with the present invention.

A fuel dispensing system 10, such as one for use at a conventional retail gasoline station, is illustrated in FIG. 1. The fuel dispensing system includes multiple fuel dispensers 12 (only one illustrated), each having two dispensing points 14 (i.e., two assemblies, each comprising a conventional hose 16 and a nozzle 18), for dispensing fuel from a UST 20. The nozzle may be a Healy 900 Series EVR/ORVR nozzle, sold by Franklin Fueling Systems, Inc., of Madison Wis. UST 20 is filled with fuel through a fuel pipe 31 which introduces the fuel into a lower portion of UST 20 through pipe end 33. The UST 20 includes a conventional fuel level sensor 22 to measure the level of fuel 24 in the UST 20.

The fuel dispensing system 10 also includes a fuel delivery system 30 for transferring fuel 24 from the UST 20 to each of the dispensing points 14. The fuel delivery system 30 typically includes a fuel supply line 32 to provide a common conduit for fuel delivery from the UST 20 to a branch fuel line 34 associated with a respective one of each of the dispensers 12. A pump 35 is provided in UST 20 to pump fuel through a fuel supply line 32 to dispensers 12. Each of the branch fuel lines 34 then splits into two fuel delivery lines 36 to provide fuel to each of the dispensing points 14 of a particular one of the dispensers 12. Each of the fuel delivery lines 36 includes a fuel flow sensor 38. Each of the fuel flow sensors 38 generates an electrical signal indicative of the quantity of fuel flowing through the sensor 38, and thus dispensed into a vehicle (not shown). In one embodiment, sensors 38 are volume sensors. The signals from the fuel flow sensors are communicated to a microprocessor based controller 26, such as Franklin Electric Co., Inc.'s TS-5 automatic tank gauge, which runs software in a conventional manner. The controller 26 and associated conventional memory 27 are typically located in a station house.

The fuel dispensing system 10 also includes a Stage II vapor recovery system 40. The vapor recovery system 40 may be either a balance type system or a vacuum-assist type system.

Similar to the fuel delivery system 30, the vapor recovery system 40 includes a common vapor return line 42 to provide a common vapor return conduit to return fuel vapor from each of the dispensing points 14 to the UST 20. Each of the dispensing points 14 has an associated dispensing point vapor return line 44. The two dispensing point vapor return lines 44 for each of the dispensing points 14 associated with a respective one of the dispensers 12 connect to a dispenser vapor return line 46. Each of the dispenser vapor return lines 46 connects with the common vapor return line 42.

A return flow sensor 48 is placed in-line with each of the dispenser vapor return lines 46 (i.e., a single return flow sensor is associated with each of the dispensers). The return flow sensors 48 generate electrical signals indicative of the magnitude of vapor return flow through their associated dispenser vapor line towards the UST 20. In one embodiment, sensor 48 is a volume sensor. These electrical signals from the return flow sensors are also electrically transmitted to the controller 26. In one embodiment, each dispenser 12 includes pump electronics 11 which monitor the condition (active or idle) of each of the dispensing points 14, sensors 38 and 48, and the customer display outputs of the dispenser 12.

As discussed above, vehicles on the road today are either on-board refueling vapor recovery (ORVR) equipped, or not. In a vehicle that is not ORVR equipped, as fuel is dispensed into the vehicle's fuel tank (a non-ORVR transaction), fuel vapor from the vehicle's fuel tank is displaced by the dispensed fuel and is returned to the UST via the vapor recovery system.

In an ORVR equipped vehicle, fuel vapor is prevented from escaping from the vehicle's fuel tank into the atmosphere. Thus as fuel is dispensed into the ORVR equipped vehicle's fuel tank (an ORVR transaction), there is no fuel vapor returned to the UST 20.

"A/L" (air/liquid) is a ratio of the volume of vapor returned to the UST 20 from a particular dispensing point 14 divided by the quantity of fuel dispensed from that dispensing point 14. The present system includes in-station diagnostics (ISD) to monitor the A/L values of the dispensing points 14 to monitor either for either a total or partial restriction in the vapor return path (a "restricted condition"). For this the ISD utilizes the return flow sensors 48 in each of the dispenser vapor return lines 46 and the fuel flow sensors 38 in each of the fuel delivery lines 36. As discussed above, the controller 26 receives a signal from each of the return flow sensors 48 and each of the fuel flow sensors 38. Because each return flow sensor 48 is in-line with two dispensing points, the controller 26 ignores a return flow signal if both dispensing points 14 associated with the common return flow sensor 48 are active.

One difficulty of detecting a restricted condition is that the A/L ratio in the event of a restricted condition may not be significantly different than the A/L ratio when refueling an ORVR equipped vehicle. The present invention contemplates two detection systems for distinguishing between a restricted condition and the refueling of an ORVR equipped vehicle. The first detection system is particularly adapted for use in conjunction with a balance type vapor recovery system, and the second detection system is particularly adapted for use in conjunction with an assist type vapor recovery system. However this does not mean that either detection system can only be used in conjunction with either a balance type vapor recovery system or an assist type vapor recovery system.

The First Detection System

Figure 2:
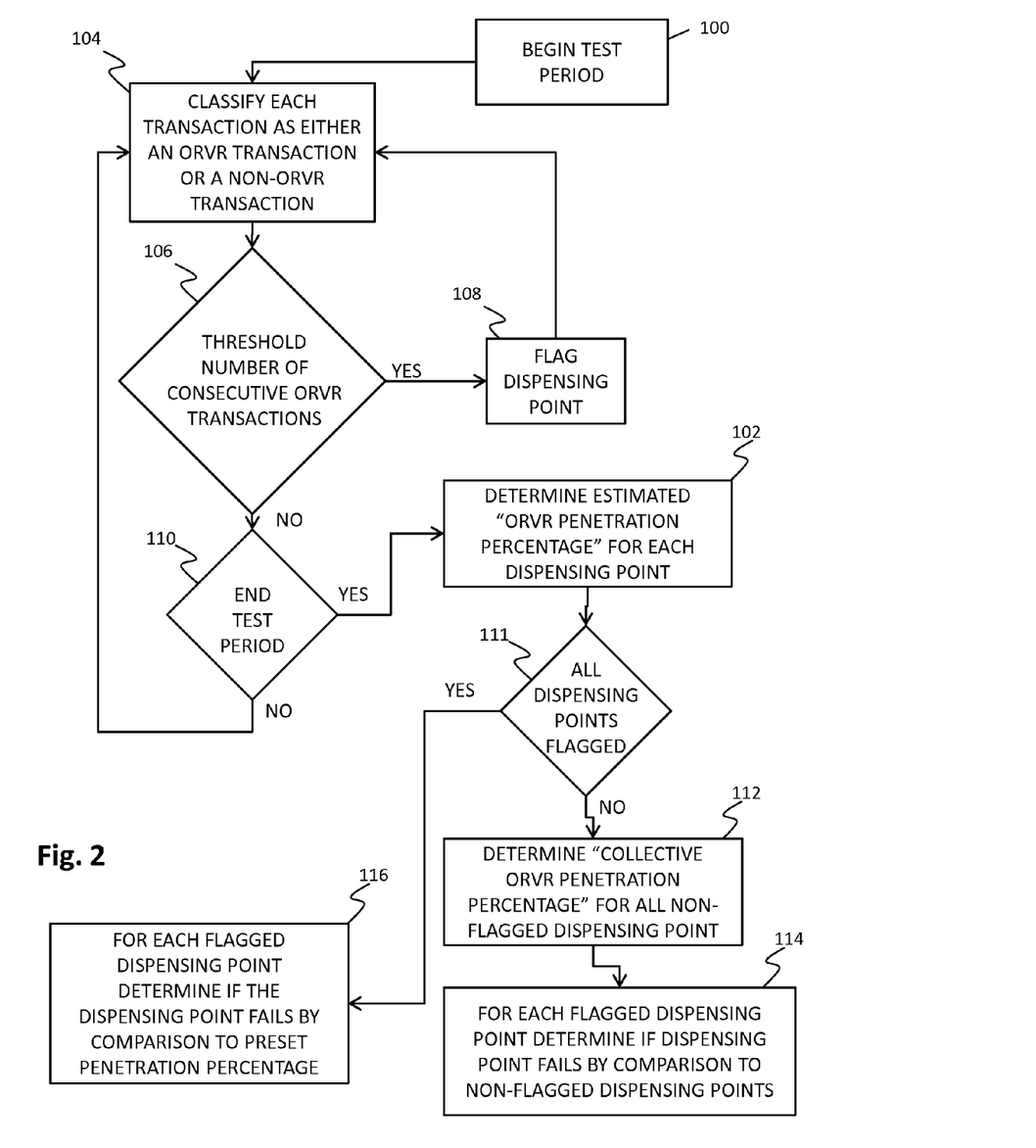
FIGS. 2 and 3 represent processing sequences of a controller of the fuel dispensing system.

Referring to FIG. 2, the controller 26 conducts the following test (represented by block 100) to detect a restricted condition. Specifically the controller determines an estimated "ORVR penetration percentage" (number of ORVR transactions divided by the total number of transactions) for each dispensing point (as represented by block 102). For purposes of this determination, the controller 26 calculates the ORVR penetration percentage for each dispensing point 14 by logging in memory 27, for each dispensing point, transactions having A/L ratios greater than a first threshold, such as greater than or equal to 0.50, as non-ORVR transactions and logging in memory 27, for each dispensing point, transactions having A/L ratios less the first threshold, such as less than 0.50, as ORVR transactions (as represented by block 104).

If the controller 26 detects a pre-set number, such as six, of consecutive ORVR transactions (as represented by block 106), a statistically an unlikely number of ORVR equipped vehicles to be consecutively refueled from the same dispensing point, the controller 26 electronically "flags" the dispensing point 14 (as represented by block 108). Once a dispensing point 14 is flagged, it remains flagged for the balance of the test period, typically a day.

At the end of each test period (as represented by block 110), the controller 26 calculates a "collective ORVR penetration percentage" of the ORVR penetration percentages of all of the non-flagged dispensing points 14 (as represented by block 112). In one embodiment, the collective ORVR penetration percentage is determined by summing the ORVR penetration percentage for each non-flagged dispensing point 14 and dividing by the total number of non-flagged dispensing points 14. The controller 26 then compares the ORVR penetration percentage of each flagged dispensing point 14 to a minimum ORVR penetration percentage required to fail (as represented by block 114). The controller 26 calculates the minimum ORVR penetration percentage required to fail as a function of the ORVR penetration percentage according to the following formula:

$$(1-\text{ORVR }\%_{NON\text{-}FlaggedFP})/2 + \text{ORVR }\%_{NON\text{-}FlaggedFP}$$

It should be noted that other formulas could be used. For example, x could be number greater than 1, but other than 2.

In order for a particular flagged dispensing point 14 to fail, the controller 26 must determine the ORVR penetration percentage of the particular flagged dispensing point 14 (ORVR $\%_{FlaggedFP}$) is greater than 1−the collective ORVR penetration percentage of the non-flagged dispensing points 14 divided by two $(1-\text{ORVR }\%_{NON\text{-}FlaggedFP})/2)$ plus the collective ORVR penetration percentage of the non-flagged dispensing points 14 (ORVR $\%_{NON\text{-}FlaggedFP}$)

The table below illustrates the minimum ORVR penetration percentage required for the controller 26 to fail a flagged dispensing point 14 (Col. C), based upon various collective ORVR penetration percentages of the non-flagged dispensing points 14 (Col. A).

| Col. A<br>Collective ORVR<br>Penetration Percentage<br>(Non-Flagged Points) | Col. B<br>Threshold % above<br>ORVR Population<br>(Col. C − Col. A) | Col. C<br>Minimum ORVR<br>Penetration Percentage<br>Required to Fail |
|---|---|---|
| 20% | 40% | 60% |
| 25% | 38% | 63% |
| 30% | 35% | 65% |
| 35% | 33% | 68% |
| 40% | 30% | 70% |
| 45% | 28% | 73% |
| 50% | 25% | 75% |
| 55% | 23% | 78% |
| 60% | 20% | 80% |
| 65% | 18% | 83% |
| 70% | 15% | 85% |
| 75% | 13% | 88% |
| 80% | 10% | 90% |
| 85% | 8% | 93% |
| 90% |  | Automatic |
| 95% |  | Automatic |
| 100% |  | Automatic |

According to the above table, if the collective ORVR penetration percentage is 90%, or greater, the controller 26 will fail any flagged dispensing point. Alternatively the controller 26 could continue to perform the above calculation for these values.

In the event that no dispensing point 14 is flagged, no comparisons are made and the controller 26 does not fail any of the dispensing points, regardless of the ORVR penetration percentage of any of the dispensing points.

In the event all of the dispensing points 14 are flagged (as represented by block 111), then the controller 26 compares the ORVR penetration percentage of each dispensing point 14 to a preset penetration percentage (as represented by block 116). The preset penetration percentage is based upon an estimate by the California Air Resources Board of the ORVR penetration percentage, and is as follows for the years 2008-2020:

| YEAR | ORVR % |
|------|--------|
| 2008 | 55 |
| 2009 | 60 |
| 2010 | 65 |
| 2011 | 70 |
| 2012 | 74 |
| 2013 | 78 |
| 2014 | 81 |
| 2015 | 85 |
| 2016 | 87 |
| 2017 | 89 |
| 2018 | 91 |
| 2019 | 93 |
| 2020 | 94 |

In such a case, if the controller determines the ORVR penetration percentage of any of the dispensing points 14 is greater than the estimated ORVR penetration percentage for the given year, the controller fails that dispensing point 14.

In the event the controller 26 fails one or more dispensing points 14, the controller 26 notifies the proper entity, such as the manager of the gasoline station. In one embodiment, an alarm is provided in the central location which includes controller 26, such as the station house. The alarm may be one or more of audio, visual, and tactile. In one embodiment, there is an audio alarm and a visible light. In one embodiment, the failed dispensing point 14 is shut down until the alarm condition is cleared. In one embodiment, the alarm condition may be communicated to proper entity over a network. Examples include an e-mail message, a fax message, a voice message, a text message, an instant message, or any other type of messaging communication.

The Second Detection System

Figure 3:
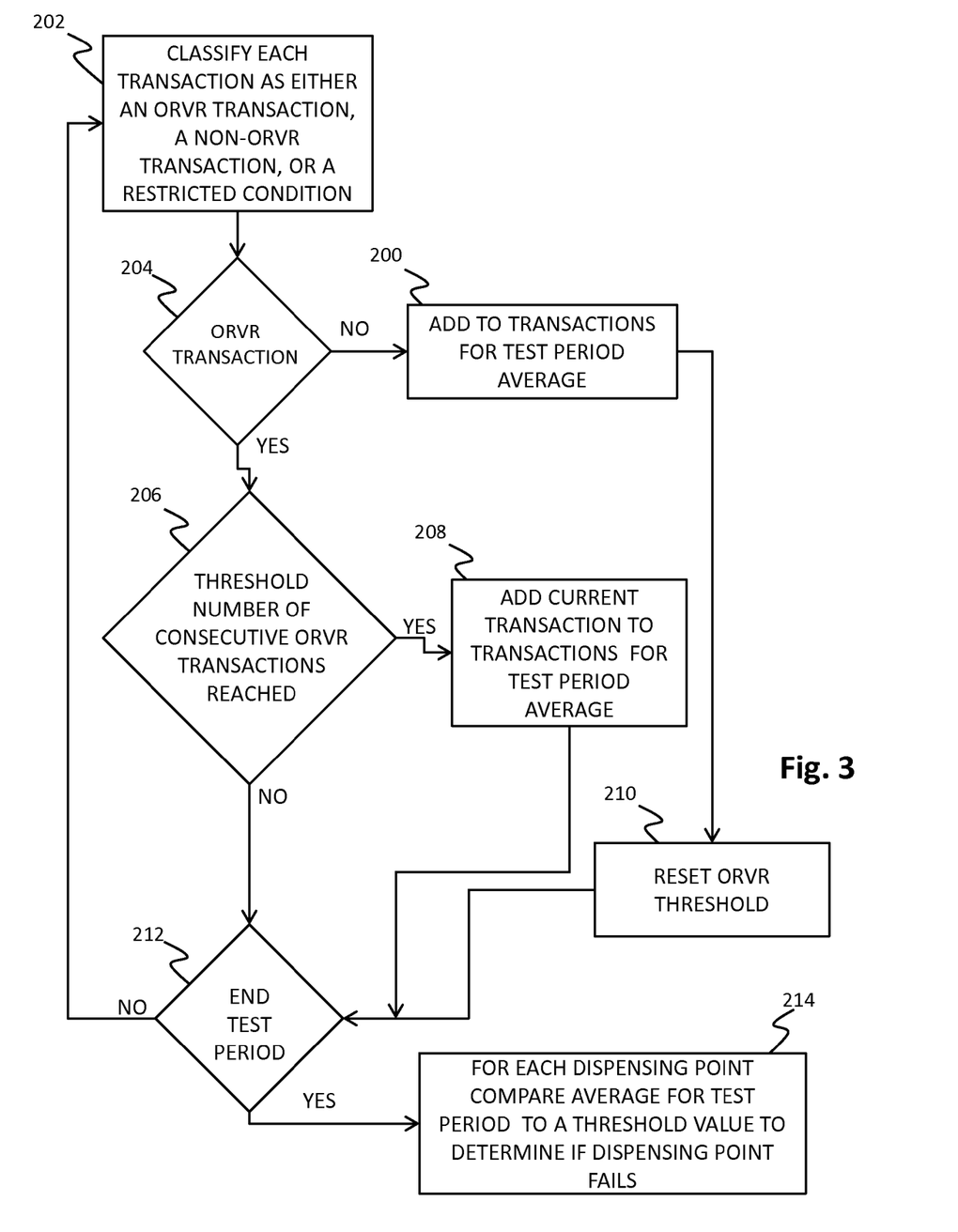

Referring to FIG. 3, according to the second detection system, the controller 26 determines a "daily average" A/L for each dispensing point (as represented by block 200). This daily average is an approximation of the average A/L for non-ORVR transactions over the course of a day. The controller 26 also determines a "weekly average" A/L, which is simply an average of the daily average A/L's, over the course of a week. For purposes of this approximation, A/L ratios greater than 0.50 are presumed to be legitimate non-ORVR transactions, and A/L ratios less than 0.15 are presumed to be a result of a restricted condition. This A/L range of 0.15-0.5 will be referred to as the ORVR Range The classification of transactions is represented by block 202. A/L ratios within the ORVR Range are presumed to be legitimate ORVR transactions.

To determine the daily and weekly average for each dispensing point 14, the controller 26 calculates a running average of all A/L transactions outside of the ORVR Range, as well as certain A/L transactions within the ORVR Range.

Specifically, initially in calculating the running average, the controller 26 ignores all transactions within the ORVR Range (as represented by block 204), assuming them to be ORVR transactions. However if the controller 26 detects a preset number, such as eleven, consecutive A/L transactions within the ORVR Range (as represented by block 206), the controller 26 begins including subsequent, consecutive transactions within the ORVR Range in calculating the running average (as represented by block 208), until such time as the controller 26 detects another A/L transaction outside of the ORVR Range, i.e., either greater than 0.50 or less than 0.15. Upon detection of a subsequent A/L transaction outside of the ORVR Range, the controller 26 subsequently only includes A/L transactions outside of the ORVR Range in calculating the running average (as generally represented by block 210), until such time as the controller 26 detects another series of eleven A/L transactions within the ORVR Range, at which time the above is repeated.

At the end of the day (as generally represented by block 212), the controller 26 compares the daily average of each of the dispensing points 14 with a threshold A/L value (as generally represented by block 214).

The Healy 900 Series nozzle has been certified by CARB to provide an A/L ratio between 0.95 and 1.15 when fueling non-ORVR equipped vehicles. CARB has also established minimum requirements for monitoring for a "Gross Failure" condition and for monitoring for a "Degradation" condition.

Monitoring for a gross failure condition is performed on a daily basis utilizing the daily average. CARB CP-201 establishes a lower threshold value of the daily average at 75% below the lower certified A/L ratio (i.e., 75% below 0.95 for a Healy 900 Series nozzle) and establishes an upper threshold value of the daily average at 75% above the higher certified A/L ratio (i.e., 75% above 1.15 for a Healy Series nozzle). For the present system utilizing a Healy 900 Series nozzle, this calculates to be 0.24 (25% of 0.95) and 2.0 (175% of 1.15), respectively. According to CARB, if the daily average is below the lower threshold value or above the upper threshold value for two consecutive assessment periods (typically one day each), an alarm must be sounded and dispensing from the respective dispensing pump must be ceased.

The controller 26 of the present system utilizes a more stringent standard. Specifically the controller 26 utilizes a lower threshold value of 0.33 (65% below 0.95 for the Healy 900 Series nozzle) and an upper threshold value of 1.90 (65% above 1.15 for the Healy 900 Series nozzle), and only over a single day.

If the controller 26 determines that the daily average A/L for a given nozzle 18 is below 0.33, or above 1.90, the controller triggers an alarm indicating a Gross Failure condition. In one embodiment, an alarm is provided in the central location which includes controller 26, such as the station house. The alarm may be one or more of audio, visual, and tactile. In one embodiment, there is an audio alarm and a visible light. In one embodiment, the alarm condition may be communicated to proper entity over a network. Examples include an e-mail message, a fax message, a voice message, a text message, an instant message, or any other type of messaging communication. The controller may also perform such other steps which are deemed necessary, such as shutting down the failed dispensing point 14 until the alarm condition is cleared.

When monitoring for a Degradation Condition, the controller 26 determines a running weekly average A/L. The weekly average A/L is determined as is the daily average A/L, discussed above, just over a seven day period, typically from early Sunday morning until late the following Saturday night. In one embodiment, the weekly average A/L is determined by using the techniques discussed herein for determining the daily average A/L except that the time period is for a week, not a day.

For monitoring for a Degradation Condition, CARB has established a lower threshold value of the weekly average A/L at least 25% below the lower certified A/L ratio (i.e., 25% below 0.95 for the Healy 900 Series nozzle) and an upper threshold value of the weekly average A/L at least 25% above the higher certified A/L ratio (i.e., 25% above 1.15 for the Healy 900 Series nozzle). For the present system with the Healy 900 Series nozzle, this calculates to be 0.71 (75% of 0.95) and 1.44 (125% of 1.15), respectively.

If the weekly average for any of the dispensing points 14 is below this lower weekly threshold value, or above this upper weekly threshold value, CARB requires a degradation condition be determined.

The controller 26 also uses more stringent weekly threshold values for determining a Degradation Condition. Specifically the controller 26 utilizes a lower weekly threshold value of 0.81 (15% below 0.95 for the Healy 900 Series nozzle) and an upper weekly threshold value of 1.32 (15% above 1.15 for the Healy 900 Series nozzle).

If the controller 26 determines that the weekly average A/L for a given nozzle 18 is below 0.81, or above 1.32, the controller 26 triggers an alarm indicating a Degradation Condition. In one embodiment, an alarm is provided in the central location which includes controller 26, such as the station house. The alarm may be one or more of audio, visual, and tactile. In one embodiment, there is an audio alarm and a visible light. In one embodiment, the alarm condition may be communicated to proper entity over a network. Examples include an e-mail message, a fax message, a voice message, a text message, an instant message, or any other type of messaging communication. The controller 26 may also perform such other steps which are deemed necessary, such as shutting down the failed dispensing point 14 until the alarm condition is cleared.

From the foregoing, it will be observed that numerous variations and modifications may be affected without departing from the spirit and scope of the invention. It is to be understood that no limitation with respect to the specific apparatus illustrated herein is intended or should be inferred.

What is claimed is:

1. For a fuel dispensing system for dispensing fuel from a plurality of dispensing nozzles into ORVR and non-ORVR equipped vehicles, the fuel dispensing system including a vapor recovery system, a method for monitoring for a restriction in the vapor recovery system comprising:
   determining over a period of time, for each dispensing nozzle, an ORVR penetration ratio of A/L ratios below a first threshold versus A/L ratios above the first threshold;
   flagging one of the dispensing nozzles if it is determined that there has been a series of detected A/L ratios at the one dispensing nozzle below the first threshold;
   upon completion of the period of time, determining an average of the ORVR penetration ratios of the non-flagged dispensing nozzles;
   determining an acceptable ORVR penetration ratio as a function of the determined average ORVR penetration ratio;
   comparing the ORVR penetration ratio of each of the flagged dispensing nozzles to the acceptable ORVR penetration ratio; and
   providing an indication for a given flagged dispensing nozzle if the penetration ratio for the flagged dispensing nozzle is greater than the acceptable ORVR penetration ratio.

2. The method of claim 1 wherein the period of time is one day.

3. The method of claim 1 wherein the period of time is one week.

4. The method of claim 1 wherein the indication is an alarm.

5. The method of claim 1 wherein the function of the average penetration ratio is equal to [(1−average penetration ratio)/x+average penetration ratio], wherein x=a number greater than 1.

6. The method of claim 5 wherein x=2.

7. The method of claim 1 wherein the method is performed by a controller.

8. For a fuel dispensing system for dispensing fuel from a plurality of dispensing nozzles into ORVR and non-ORVR equipped vehicles, the fuel dispensing system including a vapor recovery system, a system for monitoring for a restriction in the vapor recovery system comprising:
   a controller, wherein the controller;
   determines over a period of time, for each dispensing nozzle, an ORVR penetration ratio of A/L ratios below a first threshold versus A/L ratios above the first threshold;
   flags one of the dispensing nozzles if it is determined that there has been a series of detected A/L ratios at the one dispensing nozzle below the first threshold;
   upon completion of the period of time, determines an average of the ORVR penetration ratios of the non-flagged dispensing nozzles;
   determines an acceptable ORVR penetration ratio as a function of the determined average ORVR penetration ratio;
   compares the ORVR penetration ratio of the flagged dispensing nozzles to the acceptable ORVR penetration ratio; and
   provides an indication for a given flagged dispensing nozzle if the penetration ratio for the flagged dispensing nozzle is less than the acceptable penetration ratio.

9. The system of claim 8 wherein the period of time is one day.

10. The system of claim 8 wherein the period of time is one week.

11. The system of claim 8 wherein the indication is an alarm.

12. The system of claim 8 wherein the function of the average penetration ratio is equal to (1−average penetration ratio)/x+average penetration ratio, where x equals a number greater than 1.

13. The system of claim 12 wherein x=2.

* * * * *